United States Patent
Alexander et al.

[11] Patent Number: 5,964,409
[45] Date of Patent: Oct. 12, 1999

[54] HIGH-PRESSURE HOSE AND PRESSURE WASHER

[75] Inventors: Gus Alexander, Hoffman Estates; Mark Ansari, Rolling Meadows; Goki Onay, Crystal Lake, all of Ill.

[73] Assignee: FAIP North America, Inc., Schaumburg, Ill.

[21] Appl. No.: 09/033,332

[22] Filed: Mar. 2, 1998

[51] Int. Cl.[6] .............................. B05B 9/08; F16L 11/04
[52] U.S. Cl. ........................................... 239/154; 138/125
[58] Field of Search .................................. 239/152–154; 138/125, 137

[56] References Cited

U.S. PATENT DOCUMENTS

| | | | |
|---|---|---|---|
| 3,580,289 | 5/1971 | James, Jr. et al. | 138/121 |
| 4,258,755 | 3/1981 | Higbee | 138/122 |
| 4,262,704 | 4/1981 | Grawey | 138/130 |
| 4,366,746 | 1/1983 | Rosecrans | 91/467 |
| 4,380,252 | 4/1983 | Gray et al. | 138/125 |
| 4,447,378 | 5/1984 | Gray et al. | 138/125 X |
| 4,488,577 | 12/1984 | Shilad et al. | 138/127 |
| 4,699,178 | 10/1987 | Washkewicz et al. | 138/125 |
| 4,898,212 | 2/1990 | Searfoss et al. | 138/130 |
| 5,395,052 | 3/1995 | Schneider et al. | 239/154 |
| 5,413,147 | 5/1995 | Moreiras et al. | 138/109 |
| 5,419,495 | 5/1995 | Berfield | 239/154 X |

FOREIGN PATENT DOCUMENTS

| | | | |
|---|---|---|---|
| 2429680 | 1/1976 | Germany | 138/125 |
| 809307 | 2/1959 | United Kingdom | 138/125 |

Primary Examiner—Lesley D. Morris
Attorney, Agent, or Firm—Leydig, Voit & Mayer, Ltd

[57] ABSTRACT

A flexible pressure-washer hose and pressure washing apparatus are disclosed. The hose is of concentric laminar construction and comprises an inner core, an intermediate sheath covering the core, and a jacket covering the intermediate sheath. The disclosed hose has a burst pressure of at least 8000 psi, yet is highly flexible, such that the hose has a minimum bend radius of no more than about 38 mm. The disclosed pressure washer comprises a hose made in accordance with the invention and fluidically connecting a source of pressurized fluid to an operator wand.

20 Claims, 2 Drawing Sheets

2

HIGH-PRESSURE HOSE AND PRESSURE WASHER

FIELD OF THE INVENTION

The invention is in the field of pressure washing equipment, and relates specifically to hoses for high-pressure washers.

BACKGROUND OF THE INVENTION

The prior art has provided pressure washers for use in washing surfaces such as wood, tile, concrete and the like. A pressure washer typically comprises a source of a pressurized washing fluid that fluidically communicates with an operator wand via a high-pressure hose. The prior art further has provided numerous hoses for use in conjunction with such pressure washers, which hoses typically comprise a jacketed core of thermoplastic material or other material. Such conventional pressure washer hoses are capable of accommodating the moderately high pressures associated with conventional power washers while leaving a satisfactory margin of safety. Consumer applications mandate a margin of safety of 300%, and thus, for example, a hose having a nominal rating of 1000 psi will require, at a minimum, that the hose be able to accommodate a pressure of at least about 4000 psi as measured, for example, in accordance with SAE J17. The prior art has provided a number of pressure washer hoses that have such a nominal rating with a 300% safety margin.

Hoses designed for use in consumer applications must be sufficiently flexible to accommodate the demands of consumer pressure washers. The prior art has not provided a satisfactory flexible thermoplastic pressure-washer hose that is designed to operate at pressures greater than about 2000 psi, with the 300% safety margin conventionally required. Thus, such hoses are unsuitable for higher pressure applications, wherein the pressure generated by the pressure washer exceeds about 2000 psi. The limitations of known pressure washer hoses thus impose this practical pressure limit on consumer pressure washers with highly non-kinking flexible hoses.

The prior art has further provided numerous high-pressure hoses for use in applications other than pressure washers, such as industrial fire protection hoses and chemically resistant hoses for industrial equipment. Typically, such a hose comprises an inner tube covered with a reinforcing braided sheath, which, in turn, is covered by an outer jacket. Known consumer grade high-pressure hoses typically are made of very stiff materials to accommodate the high pressures expected under operating conditions, and little or no thought typically is paid to the flexibility of the hose. As a result, such hoses generally are unsuitable for use with consumer pressure washer applications, which mandate that the hose be highly flexible. Moreover, many such hoses tend to kink if bent past an angle of about 90° over a short distance, which kinking is disruptive of the flow of pressurized fluid through the hose and potentially detrimental to the hose and to the equipment serviced by the hose.

The prior art has further taught the use of corrugated hoses in an effort to increase the flexibility of the hose. Such corrugated hoses, however, are expensive to manufacture, and are thus not well suited for use with consumer pressure washers.

In light of the foregoing problems in the art, there exists a need for a flexible inexpensive pressure-washer hose that will accommodate higher pressures than conventionally attainable with known pressure washer hoses while maintaining the margin of safety required for consumer pressure washers.

OBJECTS AND SUMMARY OF THE INVENTION

It is a general object of the invention to provide a high-pressure thermoplastic hose capable of attaining an operating pressure of at least about 2000 psi, and preferably up to about 3000 psi, while remaining sufficiently flexible for use with consumer pressure washing applications.

Another object of the invention is to provide a pressure washer having a flexible hose that can accommodate operating pressures of at least about 2000 psi while maintaining the 300% safety margin desired for consumer applications.

Another general object of the invention is to provide a flexible high-pressure hose that can be manufactured inexpensively.

The foregoing general objects are achieved by the present invention, which provides a flexible high-pressure pressure-washer hose that can accommodate pressures of at least about 8000 psi, thus allowing a pressure washer to have an operating pressure of at least 2000 psi while leaving a 300% safety margin. The hose includes a flexible inner core, a flexible intermediate reinforcing sheath covering the core, and a jacket covering the flexible sheath. In accordance with the invention, the hose is provided with an inner core and sheath that each are sufficiently flexible such that the hose has a minimum bend radius at ambient pressure no greater than about 38 mm, while being capable of accommodating pressures of at least about 8000 psi.

Other objects and advantages of the invention will become apparent upon reading the following detailed description and upon reference to the drawings, in which:

Figure 1:
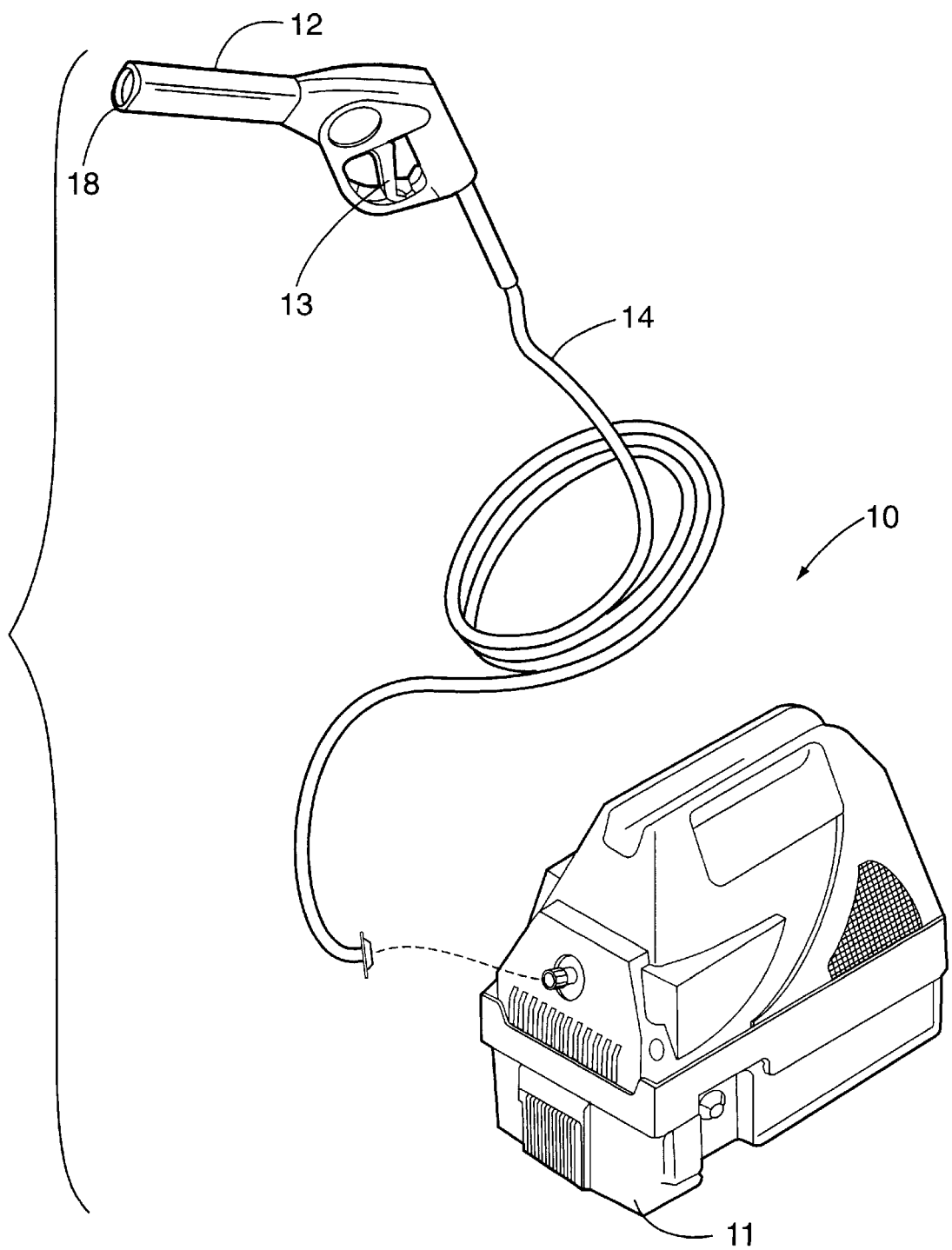
FIG. 1 is a diagramatic depiction of an illustrative pressure washer having a flexible high-pressure hose in accordance with the invention.

While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE INVENTION

Figure 2:
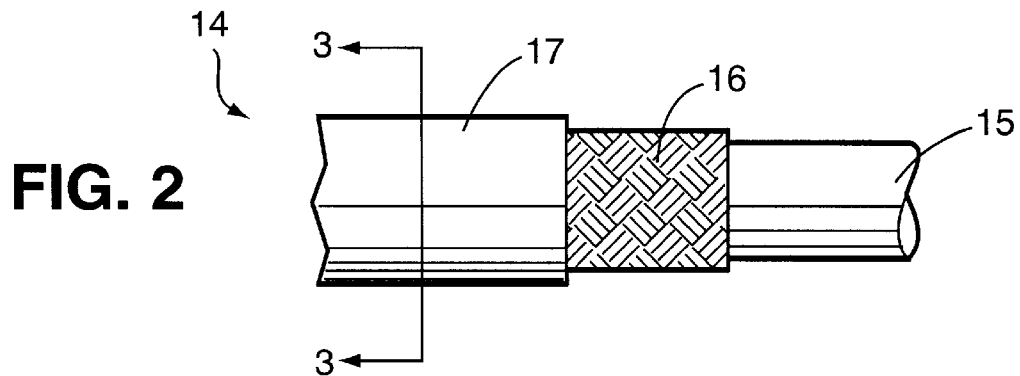
FIG. 2 is an enlarged side elevational view, partially cut away, of the high-pressure hose of the pressure washer shown in FIG. 1.

Referring now to FIG. 1, the pressure washer of the invention, shown generally at 10, is of generally conventional configuration and comprises a pump 11 fluidically connected to an operator wand 12 via a high-pressure fluid transfer hose 14. The fluid used in the pressure-washer typically is water, optionally mixed with a washing fluid such as a liquid soap. Fluid is fed from the pump 11, which typically is connected to a water line for generation of a continuous stream of pressurized water. Upon leaving the pump 11, the pressurized cleaning fluid travels through the hose 14 to the operator wand 12. The operator wand 12 typically includes a nozzle 18 and trigger valve 13 for allowing an operator to controllably direct a stream of the pressurized fluid towards a substrate for washing. The hose, wand, and fluid source each may be provided with conventional fittings and couplings to effect appropriate fluid-tight connections therebetween. The hose 14, as depicted in FIG. 2, in this instance is of concentric laminar construction, and includes a central core 15, a reinforcing sheath 16, and an outer jacket 17.

In accordance with the invention, the core 15 is composed of a flexible material, which is preferably a polymeric material and which is capable of accommodating cleaning fluid of pressures of at least about 8000 psi while maintaining a high degree of flexibility when fluid is not in the hose. Materials suitable for use in conjunction with the core are numerous, and include, for example, high tensile strength thermoplastic elastomers such as those of the SANTOPRENE® family of thermoplastic rubbers. The SANTOPRENE® elastomers having a tensile strength of at least about 14 MPa and a tear strength of at least about 40 kN/m at 25° C.

The invention is not limited to the foregoing thermoplastic elastomers, and indeed any material having suitable flexibility and strength can be used in conjunction with the invention. For example, other materials suitable for use in formulating the core include rigid polymers, such as polyvinylchloride and copolymer of polyvinylchloride with other suitable polymers, which rigid polymers are conventionally employed in less flexible high-pressure hoses. To render such materials sufficiently flexible for use in conjunction with pressure-washing applications, the rigid polymer is blended with a plasticizer in an amount effective to impart sufficient flexibility to the rigid polymer such that the finished hose has the flexibility desired. When formulating a core material, the rigid polymer is preferably present in the core material in an amount ranging from about 40% to about 60% by weight, and the plasticizer is preferably present in an amount ranging from about 20% to about 40% by weight. The core may include other materials, such as stabilizers, modifiers, and other ingredients as would be within the ordinary skill in the art.

When the core is constructed of materials such as polyvinylchloride or strong thermoplastic elastomers, it will be capable of accommodating hot pressurized aqueous washing fluids, and most preferably water. For pressure washer applications, the hose generally need not be able to accommodate oil-based fluids. In preferred embodiments of the invention, the hose will be able to accommodate washing fluids with temperatures of at least about 1000° F., more preferably, at least about 120° F., and most preferably at least about 140° F.

Figure 3:
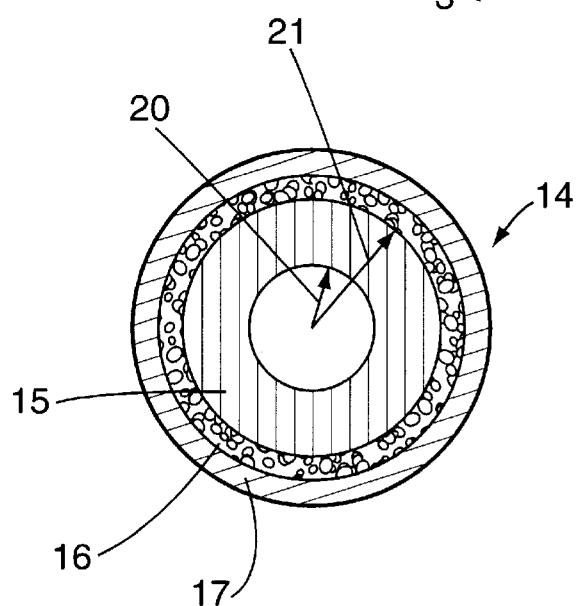
FIG. 3 is an enlarged cross-section taken in the plane of line 3—3 in FIG. 2.

The core preferably has an annular cross section that defines a fluid-carrying conduit within the core, the core having sufficient dimensions to accommodate the high-pressure washing fluid. In preferred embodiments of the invention, the inner radius 20 of the annular core, as shown in FIG. 3, ranges from about 3.2 to about 3.3 mm, and the outer radius 21 ranges from about 4.7 to about 4.8 mm. While the hose may be provided with a corrugated core (not shown), the core preferably is non-corrugated, and thus has a substantially uniform annular cross section.

With further reference to FIGS. 2 and 3, to increase the burst resistance of the hose, the hose is provided with a flexible reinforcing sheath 16, which covers and preferably is adhesively secured to the core 15. The sheath preferably is of a braided construction, and thus preferably comprises interwoven strands of a reinforcing fibrous material. Suitable braiding materials include polyester filament yarns, most preferably high-tenacity polyester filament yarns having a tenacity of from about 800 to about 900 mN/tex and a breaking strength ranging from about 85 N to about 100 N. One suitable braiding material is a high-tenacity polyester filament yarn sold under the trademark DIOLEN 183.

Generally speaking, the braided sheath and the manner in which the braided sheath is applied over the core are conventional. Many conventional hoses are reinforced with a braided sheath that has a braid angle of about 1.40 or less. To minimize bulk and material and maintain maximum flexibility of the reinforcing layer, the braided sheath of the hose of the invention preferably is braided at an angle of at least about 1.41, more preferably a braid angle ranging from about 1.41 to about 1.48. Surprisingly, it has been found that braiding the sheath at such higher braid angles than are conventionally employed will lend a higher burst strength to the hose, and yet will maintain sufficient hose flexibility to allow for use in consumer pressure washing applications. The sheathing preferably has a thickness ranging from about 1.0 to about 1.3 mm on a round yarn. If desired, the hose may be provided with a double sheathing layer, although such may detract from the flexibility of the hose.

The braided sheath is preferably adhesively secured to the core layer with a compatible adhesive, which preferably comprises a urethane or acrylate adhesive. One suitable adhesive comprises a mixture of polyurethane and methyl ethyl ketone. The adhesive may be included in any amount sufficient to impart adhesion between the core and sheath, preferably an adhesive strength sufficient to prevent separation of the core from the sheath when the hose is bent.

To prevent damage to the braided layer and to render the hose resistant to abrasion during use, the hose is provided with a jacket layer 17 made of an abrasion-resistant flexible material. The jacket material may be similar or dissimilar to the core material, and thus, for example, the jacket layer may comprise a SANTOPRENE® rubber or a plasticized rigid polymer as described more fully hereinabove. The jacket preferably has a thickness of about 1.0 to about 1.2 mm. The jacket preferably is adhesively secured to the braided sheath with sufficient adhesive to impart adhesion between the jacket and the sheath, preferably sufficient to provide an adhesive strength sufficient to prevent separation between the jacket and sheath when the hose is bent. The adhesive is preferably similar or identical to that used to adhesively connect the sheath and core.

Figure 4:
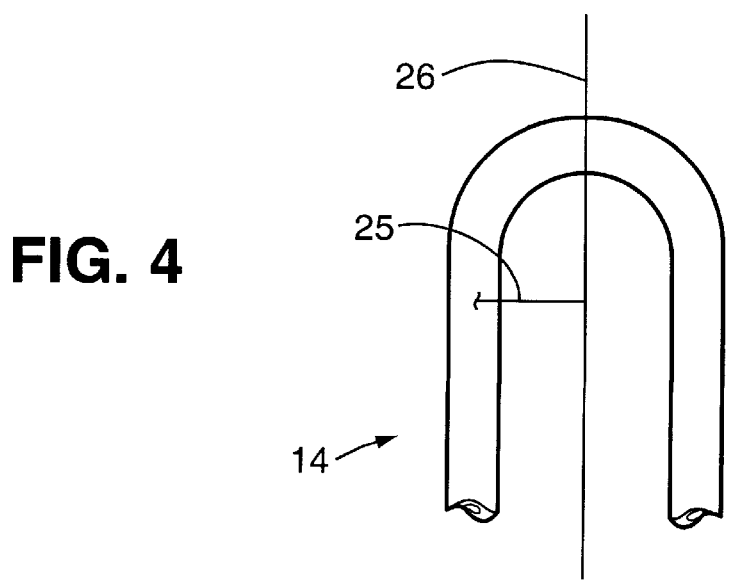
FIG. 4 is a plan view of the hose shown in FIG. 2 when the hose is bent through an angle of 180°.

In accordance with a further feature of the invention, the hose has a minimum bend radius no greater than about 38 mm. The minimum bend radius may be determined by bending the hose with no fluid contained therein over an angle of 180° and by reducing the size of the bend to as small a diameter as possible without kinking the hose, as shown, for example, in FIG. 4. The minimum bend radius 25 of the hose 14 may be defined as the distance between the central bend line 26 of the bent portion of the hose and the center of the hose, the distance being measured along an angle normal to the bend line 26. Surprisingly, by incorporating a flexible material in the core of the hose of the present invention, a high-pressure hose having a minimum bend radius no greater than about 38 mm while maintaining the ability to accommodate high pressures may be provided. In preferred embodiments, the invention provides a hose that has a minimum bend radius no greater than about 36 mm. More preferably, the minimum bend radius is no greater than about 34 mm, and even more preferably, the minimum bend radius is no greater than about 32 mm. The high-pressure hose of the invention will thus be sufficiently flexible for use in consumer pressure washing applications.

For use in consumer applications, the hose will be provided with a hose rating sufficiently below the burst pressure of the hose to leave a 300% margin of safety between the rated pressure and the burst pressure. The burst pressure of the hose is the gauge pressure that the hose will accommodate before bursting. Thus, for example, a hose with a hose rating of 2000 psi will have a burst pressure of at least about 8000 psi, it being understood that the hose will accommodate pressures of at least 8000 psi, and possibly higher pressures, before bursting. Preferably, the hose of the invention has a burst pressure of at least about 8000 psi. More preferably, the hose has a burst pressure of at least about 9000 psi, even more preferably, the burst pressure is at least about 10,400 psi, and most preferably the burst pressure is at least about 12,000 psi.

To ensure the structural integrity of the hose, the hose should have a minimum impulse value of at least about 10,000 cycles, more preferably, at least about 20,000 cycles, and most preferably, at least about 30,000 cycles. The impulse value is conventionally defined and refers to the number of cycles for which the hose may be pressurized to its hose rating (i.e., 25% of the burst pressure) and reduced to zero gauge pressure before failure of the hose, each pressurization and depressurization constituting one cycle. The impulse test and equipment for conducting the impulse test are well known in the art.

Most preferably, the hose of the invention is substantially non-deforming, such that the dimensions of the hose do not change when the pressure washer is operated at its rated pressure (i.e., 25% of the burst pressure). In preferred embodiments, the hose of the invention preferably has an elongation at its rated pressure of no more than about 5%, and preferably no more than about 3%. Most preferably, the volumetric expansion of the hose at the rated pressure preferably is no more than about 4.0 cc/ft., more preferably, no more than about 3.8 cc/ft., and most preferably, no more than about 3.5 cc/ft.

The following examples are provided to illustrate the present invention, and should not be construed as limiting in scope.

EXAMPLE 1

A high-pressure hose is provided. The hose comprises a core composed of polyvinylchloride and a plasticizer in an amount effective to impart flexibility to the polyvinylchloride. The core layer further includes a sulfate-based coprecipitate stabilizer, such as an INTERSTAB stabilizer in an amount sufficient to stabilize the core material. The core may include any suitable rigid polymer, such as EVIPOL polymers and SPVC polymers. If desired, a modifier such as CHEMIGUM may be included in an amount suitable to impart a modified property to the core, for example, an amount of from about 5% to about 15% by weight. Other suitable ingredients, such as calcium carbonate, may be employed if desired.

The plasticized polyvinylchloride is extruded through an annular die to form a thermoplastic hose having an inner diameter of about 6.4 mm and an outer diameter ranging from about 12 to about 13 mm. Over the extruded core is braided a high-tenacity polyester filament yarn. The yarn is braided with a braid angle of 1.41 over a layer of adhesive disposed on the core to provide an adhesive bond between the inner core and braided sheath. An outer jacket is applied over the sheath.

The hose thus formed has a burst pressure of minimum 8000 psi, and thus has a hose rating of 2000 psi. The minimum impulse value of the hose is greater than 30,000 cycles. The elongation at the hose rated pressure is 3% and the volumetric expansion at the rated pressure is about 3.5±0.5 cc/ft. The hose can accommodate pressurized cleaning fluids at temperatures of up to 140° F.

EXAMPLE 2

A high-pressure hose is provided in accordance with the teachings of Example 1, except that the inner core and jacket layer each comprise a SANTOPRENE® thermoplastic rubber. The hose thus formed has a minimum burst strength of 12,000 psi, a minimum impulse value greater than 30,000 cycles, an elongation at rated pressure (3000 psi) of 3%, and a volumetric expansion of about 3.5±5 cc/ft at the rated pressure.

All pressures stated herein are gauge pressures.

We claim:

1. A thermoplastic high-pressure hose comprising:
   an inner core comprising a flexible material and defining a fluid-carrying conduit; a flexible reinforcing sheath covering said core; and a jacket covering said sheath, said hose having a minimum bend radius no greater than about 38 mm at ambient pressure and a burst pressure of at least about 8000 psi.

2. A high-pressure hose according to claim 1, said hose having a burst pressure of at least about 9000 psi.

3. A high-pressure hose according to claim 1, said hose having a burst pressure of at least about 10,400 psi.

4. A high-pressure hose according to claim 1, said hose having a burst pressure of at least about 12,000 psi.

5. A high-pressure hose according to claim 1, said hose having a volumetric expansion of no more than about 4.0 cc/ft. at a pressure of 25% of said burst pressure.

6. A high-pressure hose according to claim 1, said hose having an elongation of no more than about 3% at a pressure of 25% of said minimum burst pressure.

7. A high-pressure hose according to claim 1, said sheath being a braided sheath comprising braided polyester strands having a braid angle of at least about 1.41.

8. A high-pressure hose according to claim 1, wherein said hose has a minimum impulse value of at least about 30,000 cycles.

9. A high-pressure hose according to claim 1, wherein said core layer comprises a rigid polymer and a plasticizer present in an amount sufficient to impart flexibility to said rigid polymer.

10. A high-pressure hose according to claim 9, wherein said rigid polymer comprises PVC.

11. A pressure-washing apparatus comprising:
    a source of pressurized water; an operator wand; and a hose fluidically connecting said operating wand to said source, said hose comprising an inner core comprising a flexible material and defining a fluid-carrying conduit; a flexible reinforcing sheath covering said core; and a jacket covering said sheath, said hose having a minimum bend radius no greater than about 38 mm at ambient pressure, and a burst pressure of at least about 8000 psi.

12. A pressure-washing apparatus according to claim 11, said hose having a burst pressure of at least about 9000 psi.

13. A pressure-washing apparatus according to claim 11, said hose having a burst pressure of at least about 10,400 psi.

14. A pressure-washing apparatus according to claim 11, said hose having a burst pressure of at least about 12,000 psi.

15. A pressure-washing apparatus according to claim 11, said hose having a volumetric expansion of no more than about 4.0 cc/ft. at a pressure of 25% of said minimum burst pressure.

16. A pressure-washing apparatus according to claim 11, said hose having an elongation of no more than about 3% at a pressure of 25% of said minimum burst pressure.

17. A pressure-washing apparatus according to claim 11, said sheath being a braided sheath comprising braided polyester strands having a braid angle of at least about 1.41.

18. A pressure-washing apparatus according to claim 11, wherein said hose has a minimum impulse value of at least about 30,000 cycles.

19. A pressure-washing apparatus according to claim 11, wherein said core layer comprises a rigid polymer and a plasticizer present in an amount sufficient to impart flexibility to said rigid polymer.

20. A pressure-washing apparatus according to claim 19, wherein said rigid polymer comprises PVC.

* * * * *

(12) EX PARTE REEXAMINATION CERTIFICATE (7588th)
United States Patent
Alexander et al.

(10) Number: US 5,964,409 C1
(45) Certificate Issued: Jul. 6, 2010

(54) HIGH-PRESSURE HOSE AND PRESSURE WASHER

(75) Inventors: Gus Alexander, Hoffman Estates, IL (US); Mark Ansari, Rolling Meadows, IL (US); Goki Onay, Crystal Lake, IL (US)

(73) Assignee: FAIP North America, Inc., Schaumburg, IL (US)

Reexamination Request:
No. 90/010,538, Jun. 2, 2009

Reexamination Certificate for:
Patent No.: 5,964,409
Issued: Oct. 12, 1999
Appl. No.: 09/033,332
Filed: Mar. 2, 1998

(51) Int. Cl.
*B05B 9/08* (2006.01)
*F16L 11/04* (2006.01)

(52) U.S. Cl. .......................... 239/154; 138/125
(58) Field of Classification Search ........... 239/152–154
See application file for complete search history.

(56) References Cited

U.S. PATENT DOCUMENTS

| 3,725,167 A | 4/1973 | Love et al. |
| 4,553,568 A | 11/1985 | Piccoli et al. |
| 4,603,712 A | 8/1986 | Krause |
| 5,362,530 A | 11/1994 | Kitami et al. |
| 5,380,571 A | 1/1995 | Ozawa et al. |
| 5,419,495 A | 5/1995 | Berfield |

*Primary Examiner*—Jimmy T Nguyen

(57) ABSTRACT

A flexible pressure-washer hose and pressure washing apparatus are disclosed. The hose is of concentric laminar construction and comprises an inner core, an intermediate sheath covering the core, and a jacket covering the intermediate sheath. The disclosed hose has a burst pressure of at least 8000 psi, yet is highly flexible, such that the hose has a minimum bend radius of no more than about 38 mm. The disclosed pressure washer comprises a hose made in accordance with the invention and fluidically connecting a source of pressurized fluid to an operator wand.

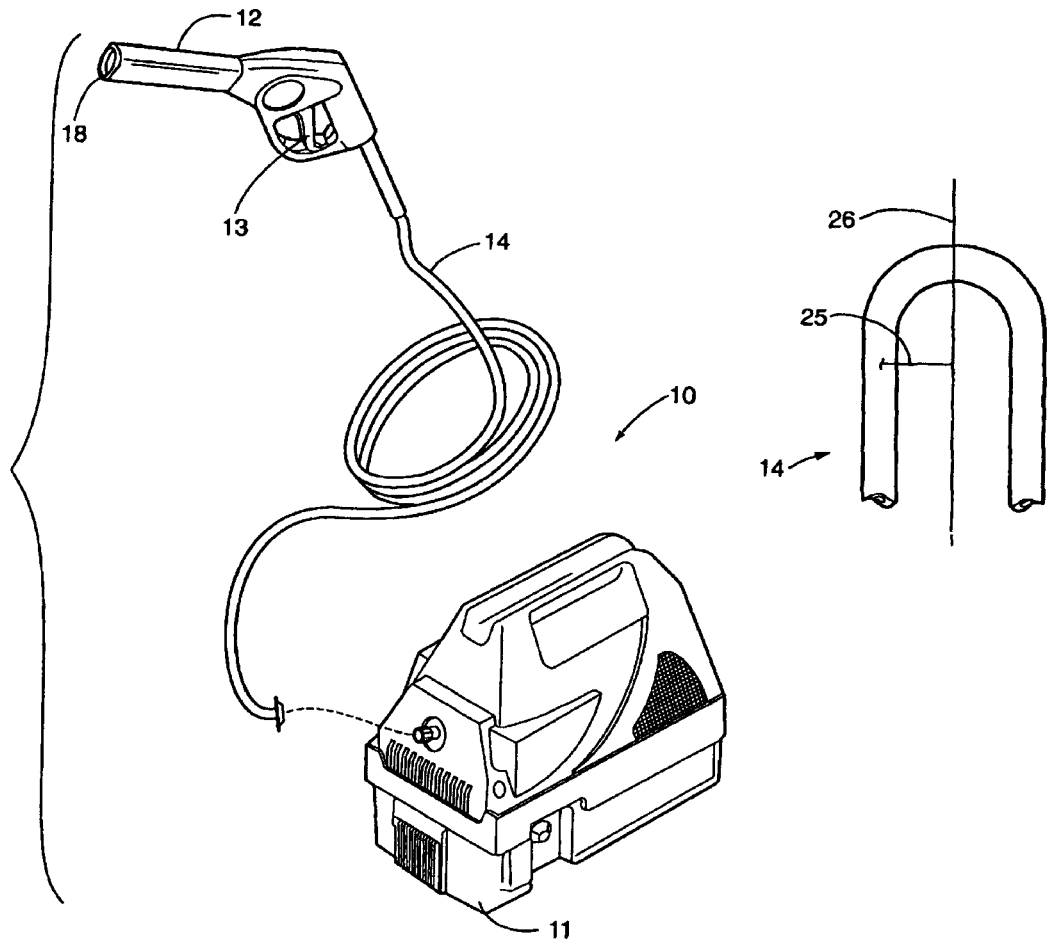

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 11 and 17 are determined to be patentable as amended.

Claims 2-6, 8-10, 12-16 and 18-20, dependent on an amended claim, are determined to be patentable.

New claims 21, 22 and 23 are added and determined to be patentable.

1. A thermoplastic high-pressure *pressure washer* hose comprising:
    an inner core comprising a flexible material and defining a fluid-carrying conduit; a flexible reinforcing sheath covering said core; [and] a jacket covering said sheath[, ]; *said inner core and jacket each comprising a thermoplastic elastomeric material free of a rubber constituent, said hose having a burst pressure of at least 8,000 psi; and* said hose having *an outer diameter of at least about 12 mm and* a minimum bend radius no greater than about 38 mm at ambient pressure[and a burst pressure of at least about 8000 psi].

7. A high-pressure hose according to claim 1, said sheath being a braided sheath comprising braided polyester strands having a braid angle of [at least] *between* about 1.41 *and 1.48*.

11. A pressure-washing apparatus comprising:
    *a pump unit for providing* a source of pressurized water; an operator wand; and a hose fluidically connecting said operating wand to said [source,] *pump unit;* said hose comprising an inner core comprising a flexible *thermoplastic elastomeric* material [and] defining a fluid-carrying conduit; a flexible reinforcing sheath covering said core; and a jacket *comprising a flexible thermoplastic elastomeric material* covering said sheath[, said hose having]; *said hose having a burst pressure of at least 8,000 psi; and said hose having an outer diameter of at least about 12 mm, and* a minimum bend radius no greater than about 38 mm at ambient pressure[, and a burst pressure of at least about 8000 psi].

17. A pressure-washing apparatus according to claim 11, said sheath being a braided sheath comprising braided polyester strands having a braid angle of [at least] *between* about 1.41 *and 1.48*.

21. *A high pressure hose according to claim 1 in which said core has an inner diameter of at least about 6.4 mm.*

22. *A pressure washer apparatus according to claim 11 in which said inner core and jacket each comprise a thermoplastic elastomeric material free of a rubber constituent.*

23. *A pressure washing apparatus according to claim 11 in which said core has an inner diameter of at least about 6.4 mm.*

\* \* \* \* \*